(12) United States Patent
Felske et al.

(10) Patent No.: US 8,036,956 B1
(45) Date of Patent: Oct. 11, 2011

(54) SECURE, DIFFERENTIATED READING OF SENSORS AND RFID TAGS

(75) Inventors: Kent Felske, Kanata (CA); Eric Bernier, Kanata (CA)

(73) Assignee: Nortel Networks Limited, Mississauga, Ontario (CA)

( * ) Notice: Subject to any disclaimer, the term of this patent is extended or adjusted under 35 U.S.C. 154(b) by 1224 days.

(21) Appl. No.: 11/287,131

(22) Filed: Nov. 23, 2005

Related U.S. Application Data

(60) Provisional application No. 60/630,411, filed on Nov. 23, 2004.

(51) Int. Cl.
 *G06Q 10/00* (2006.01)
(52) U.S. Cl. .................................... 705/28; 705/26.1
(58) Field of Classification Search ............... 705/26, 705/26.1–28
 See application file for complete search history.

(56) References Cited

U.S. PATENT DOCUMENTS

| 6,671,729 | B1 * | 12/2003 | Gordon et al. ............... 709/227 |
| 2004/0138921 | A1 * | 7/2004 | Broussard et al. ............. 705/2 |
| 2005/0010494 | A1 * | 1/2005 | Mourad et al. ................ 705/26 |

OTHER PUBLICATIONS

"Business process improvement through electronic data interchange (EDI) systems: An empiricalstudy". Bhatt, Ganesh D. Supply Chain Management, v6n2, p. 60-74, 2001. Retrieved via Dialog on Jun. 5, 2011.*

* cited by examiner

*Primary Examiner* — Michael A. Misiaszek
(74) *Attorney, Agent, or Firm* — Anderson Gorecki & Manaras LLP

(57) ABSTRACT

Secure access to inventory data concerning a supplier's product located at a seller's premises is provided by tagging units of product with a supplier identifier and a product identifier. The identifiers may be embedded in RFID tags or EPC labels. A secure VPN tunnel is established between a supplier and a seller. The VPN tunnel is associated with a particular supplier identifier such that only inventory data associated with the supplier identifier that matches the supplier is transmitted on the VPN tunnel, and inventory data associated with supplier identifiers that do not match the supplier are filtered out. Hence, the seller can provide the supplier with access to inventory data without exposing sensitive information related to the seller and other suppliers.

18 Claims, 4 Drawing Sheets

SECURE, DIFFERENTIATED READING OF SENSORS AND RFID TAGS

CROSS-REFERENCE TO RELATED APPLICATIONS

A claim of priority is made to U.S. Provisional Patent Application Ser. No. US60/630,411, entitled SECURE DIFFERENTIATED READING OF SENSORS AND TAGS, filed Nov. 23, 2004, which is incorporated herein by reference.

FIELD OF THE INVENTION

This invention relates generally to the field of network communications, and more particularly to inventory management.

BACKGROUND OF THE INVENTION

Information Technology ("IT") has enabled enterprises to more accurately monitor and control critical aspects of their business such as inventory. With accurate, timely inventory data an enterprise can order supplies and build products in a timely manner, thereby reducing the possibilities of running short of supplies or products, and storing more product than can be sold in a reasonably short amount of time. However, recent trends in business practices have made it more difficult for some enterprises to obtain accurate and timely inventory data.

It is now common for suppliers to large retailers to retain ownership of products up until the time of purchase. Further, the suppliers may be held responsible for maintaining a sufficient supply of product in the stores. Obtaining accurate and timely inventory data under such circumstances is difficult because, apart from manually monitoring the stores, the inventory data can only be obtained via the network of the retailer. Referring to FIG. 1, the retailer or supplier may tag products with Radio Frequency ID ("RFID") tags (100) which are detectable by RFID readers (102) positioned in the store so that it becomes possible to automatically determine how many units (104) of a given product are on the store shelves. Data from all RFID readers in a store, and even from multiple stores, may be provided to the retailer's RFID Event Management System (106), and subsequently to a data center (108) via a Virtual Local Area Network ("VLAN") on an Enterprise IP network (110). However, in order to prevent a given supplier, e.g., supplier (112), from obtaining sensitive data associated with the retailer or other suppliers (114, 116) it is necessary to limit the supplier's access to data in the data center (108). In particular, it is necessary for the retailer to determine which supplier provided the product for each supplier inquiry about a product in order to limit the access of supplier (112) to only data associated with product provided by that supplier (112). This can be complicated and time consuming because associations between products and suppliers are manually entered by the retailer, e.g., via an RFID back office station (118), and a retailer may sell many different types of products, change product lines frequently, and obtain particular products from multiple suppliers. For these and other reasons suppliers would like to have technology that eliminates the need for them to maintain a large centralized database from their warehouse by shifting responsibility for data retrieval and retention to the individual suppliers.

SUMMARY OF THE INVENTION

In accordance with the invention, a method for providing a supplier with secure access to inventory data indicative of units of product at a seller's premises comprises the steps of: associating a product identifier with each unit of product; associating a supplier identifier with each unit of product; detecting, with a reader, the product identifier and supplier identifier associated with a unit of product, thereby producing inventory data; establishing a secure Virtual Private Network ("VPN") tunnel between the supplier and the seller; steering inventory data associated with the supplier identifier that matches the supplier to the VPN tunnel; and filtering inventory data associated with supplier identifiers that do not match the supplier from the VPN tunnel.

In further accordance with the invention apparatus for providing a supplier with secure access to inventory data indicative of units of product at a seller's premises comprises: a machine-readable product identifier associated with each unit of product; a machine-readable supplier identifier associated with each unit of product; a reader operable to detect the product identifier and supplier identifier associated with a unit of product, thereby producing inventory data; a secure Virtual Private Network ("VPN") tunnel established between the supplier and the seller; and at least one network device operable to steer inventory data associated with the supplier identifier that matches the supplier to the VPN tunnel and filter inventory data associated with supplier identifiers that do not match the supplier from the VPN tunnel.

The invention has advantages including providing the supplier with direct access to inventory data without exposing sensitive information related to the seller and other suppliers. Supplier access to inventory data is enhanced because associations between products and suppliers need not be manually entered. In particular, since each unit of product is tagged with a supplier identifier it is no longer necessary to refer to a database to determine which supplier provided a particular unit of product. Further, because a particular supplier's VPN tunnel is only permitted to carry inventory data associated with the supplier's identifier it is no longer necessary to refer to a table to determine whether a particular supplier is permitted to receive data concerning a particular unit of product.

DETAILED DESCRIPTION

Figure 1:
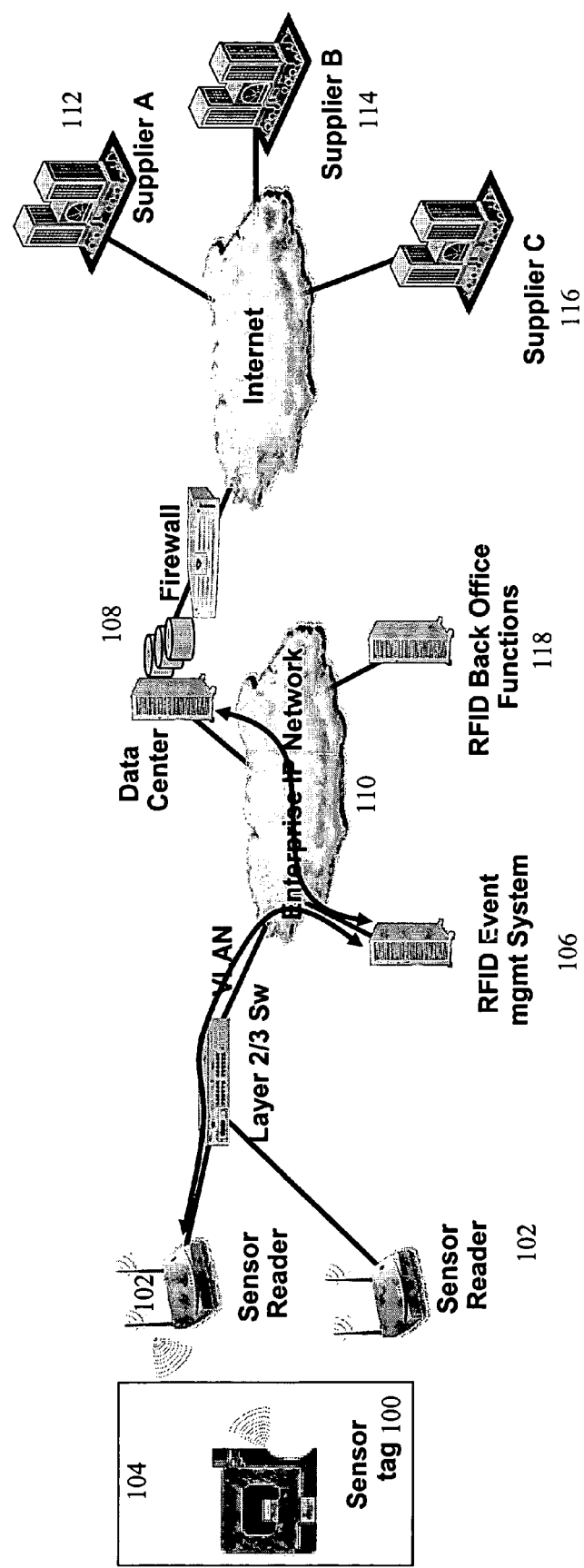
FIG. 1 is a prior art network diagram illustrating inventory control.
Figure 2:
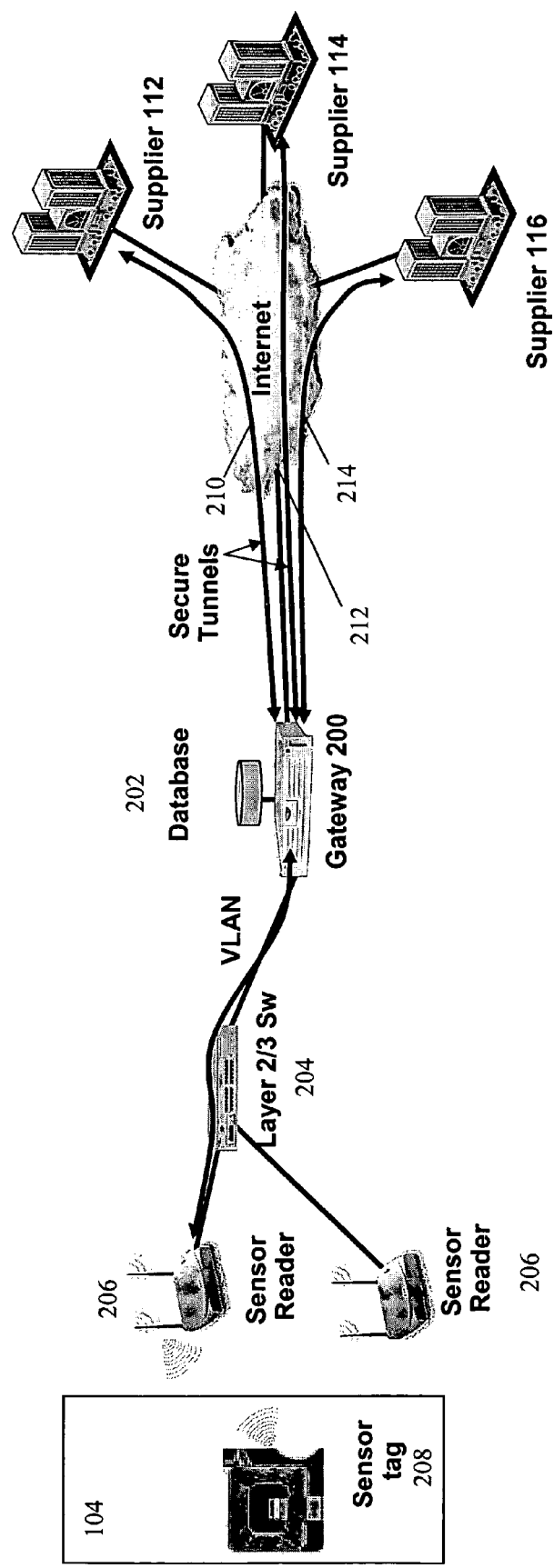
FIG. 2 illustrates an embodiment of inventory control in accordance with the invention.
Figure 3:
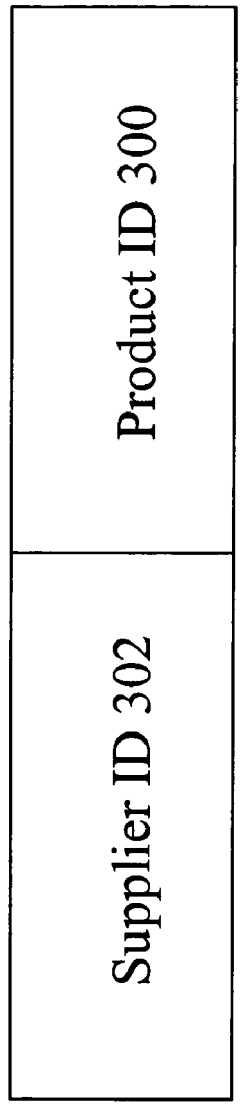
FIG. 3 illustrates the RFID tag in greater detail.

Referring to FIGS. 2 and 3, an enterprise such as a retailer has a network including a gateway (200), database (202), switches (204) and RFID readers (206). RFID tags (208) are affixed to units (104) of product by the enterprise or suppliers. The RFID readers are strategically positioned within stores in order to detect the RFID tags and thereby to determine the number of units of product present in the store. In particular, each RFID tag (208) includes product type identifier (300) which uniquely identifies the product in a manner similar to an Electronic Packaging Code ("EPC"). The readers are operable to scan for RFID tags either periodically or in response to a prompt, and to forward the resulting data to the gateway (200) via the Layer 2/3 switch (204).

In order to facilitate secure provision of inventory data to the suppliers, a binding is created between each unit (104) of product and a particular supplier, e.g., supplier (112). The binding is accomplished via the RFID tags (208). In particular, each RFID tag includes a unique supplier identifier (302) similar to an EPC. By including both a product ID (300) and supplier ID (302) in the RFID tag it becomes possible to differentiate between identical products provided by different suppliers. Further, as will be discussed below, it becomes possible to facilitate secure access to inventory data.

Figure 4:
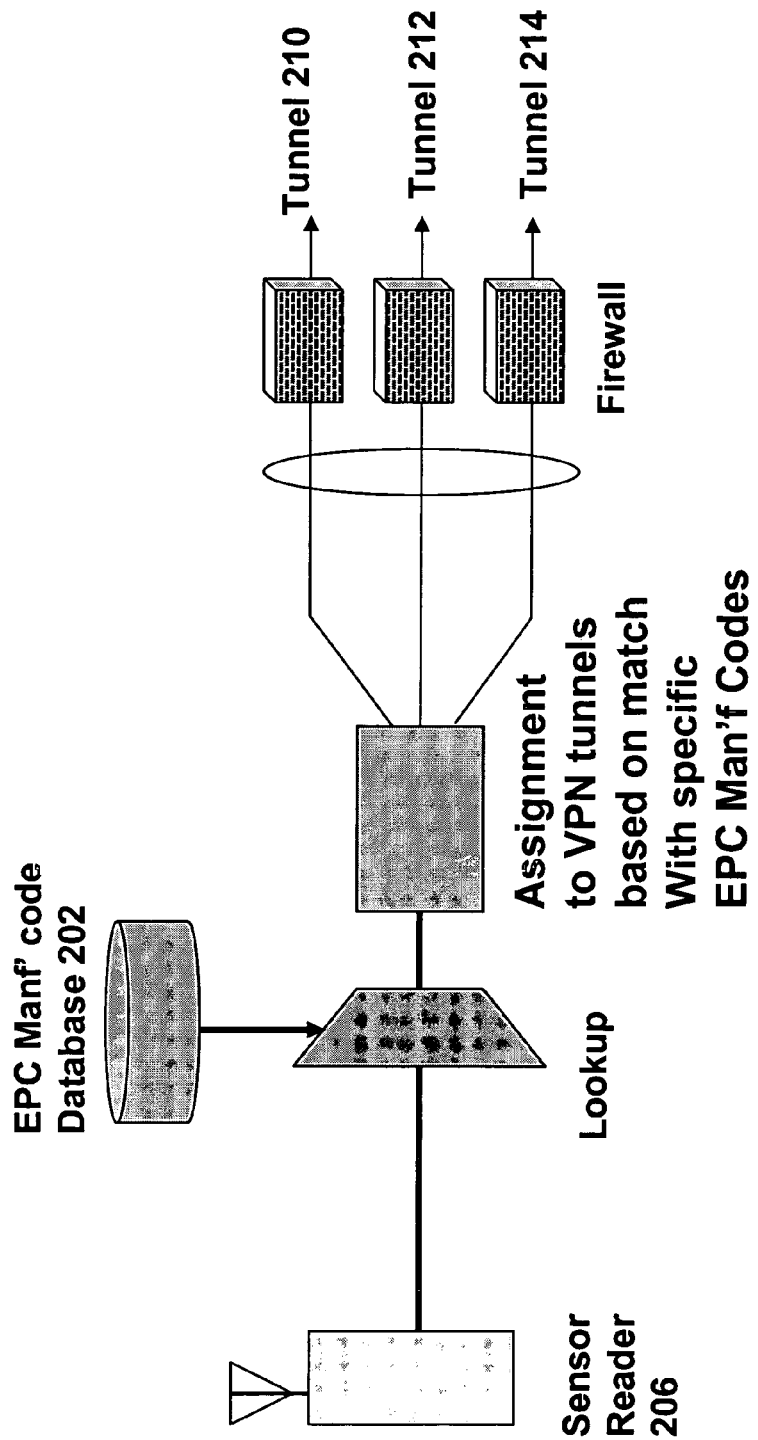
FIG. 4 illustrates the gateway of FIG. 2 in greater detail.

Referring now to FIGS. 2-4, the gateway (200) employs secure VLAN tunnels (210, 212, 214) and the supplier identifiers (302) to provide suppliers with accurate, timely inventory data while mitigating the need for manually associating particular products with particular suppliers. Each supplier is provided with a secure VLAN tunnel to the gateway via the Internet, e.g., supplier (112) has tunnel (210), supplier (114) has tunnel (212), and supplier (116) has tunnel (214). The supplier database (202) is employed to store these bindings between VLAN tunnels and supplier identifiers. The gateway (200) performs a filtering function such that only data regarding products having a particular supplier identifier in the RFID can be provided on a given VLAN tunnel, e.g., if the supplier ID (302) corresponds to supplier (112) then tunnels (212, 214) are only then permitted to transport that data. Further, the gateway performs a steering function such that a given VLAN tunnel is only permitted to receive data associated with a particular supplier identifier, e.g., if the supplier ID (302) corresponds to supplier (112) then the data is directed to tunnel (210). The supplier identifier to VLAN tunnel bindings in the database may be manually maintained. However, this maintenance is less complex and time-consuming than maintaining a database of bindings between suppliers and individual products because there are likely to be fewer entries, and those entries are less likely to change over time.

In an alternative embodiment the reader (206) determines the supplier ID from some other identifier. For example, if a particular product ID is only supplied by one supplier then the product ID itself is a supplier ID. The reader (206) may also be operable to mark packets with an appropriate supplier code, or even the appropriate VLAN identifier. Alternatively, data from an RFID tag is combined with data from an EPC label to provide inventory data. For example, the RFID tag might include the product ID, but not the supplier ID, while the EPC label includes an indication of the supplier ID, e.g., an index into an EPC manufacturer's code in database (202). In this scenario an inventory update could be created at the point of sale by sensing the RFID tag at the time the EPC label is scanned, performing an EPC lookup to identify the manufacturer, and then transporting the data on the VPN tunnel assigned to that EPC manufacturer's code.

In another alternative embodiment the reader or Layer 2/3 switch may implement filtering and steering. In particular, secure VPN tunnels may be created between the suppliers and each reader or Layer 2/3 switch. The VPN tunnels could be formed using IPSec or SSL protocols. Only one supplier is permitted to be associated with any given tunnel.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. A method for providing a supplier with secure access to inventory data indicative of units of product at a seller's premises comprising the steps of:
   associating a product identifier with each unit of product;
   associating a supplier identifier with each unit of product;
   detecting, with a reader, the product identifier and supplier identifier associated with a unit of product, thereby producing inventory data;
   establishing a separate secure Virtual Private Network ("VPN") tunnel between the supplier and each of a plurality of different sellers, including a first VPN tunnel between the supplier and the seller;
   steering inventory data associated with the supplier identifier that matches the supplier to the first VPN tunnel; and
   filtering inventory data associated with supplier identifiers that do not match the supplier from the first VPN tunnel.

2. The method of claim 1 in which at least one of the product identifier and supplier identifier are represented in a Radio Frequency Identification ("RFID") tag.

3. The method of claim 1 in which at least one of the product identifier and supplier identifier are represented in an Electronic Packaging Code ("EPC") label.

4. The method of claim 1 in which the detecting step include the further step of determining the number of units of the product at the premises.

5. The method of claim 1 in which the detecting step include the further step of determining that a unit of product has been removed from the premises.

6. The method of claim 1 wherein the steering and filtering steps are executed by a gateway having access to a supplier database having indications of associations between suppliers and VPN tunnels.

7. The method of claim 1 wherein the steering and filtering steps are executed by a reader, and including the further step of marking a packet containing inventory data with a VPN tunnel identifier.

8. The method of claim 1 wherein the VPN tunnel is established via IPSec.

9. The method of claim 1 wherein the VPN tunnel is established via SSL.

10. Apparatus for providing a supplier with secure access to inventory data indicative of units of product at a seller's premises comprising:
    a machine-readable product identifier associated with each unit of product;
    a machine-readable supplier identifier associated with each unit of product;
    a reader operable to detect the product identifier and supplier identifier associated with a unit of product, thereby producing inventory data;
    a separate secure Virtual Private Network ("VPN") tunnel established between the supplier and each of a plurality of different sellers, including a first VPN tunnel between the supplier and the seller; and
    at least one network device operable to steer inventory data associated with the supplier identifier that matches the supplier to the VPN tunnel and filter inventory data associated with supplier identifiers that do not match the supplier from the VPN tunnel.

11. The apparatus of claim 10 in which at least one of the product identifier and supplier identifier are represented in a Radio Frequency Identification ("RFID") tag.

12. The apparatus of claim 10 in which at least one of the product identifier and supplier identifier are represented in an Electronic Packaging Code ("EPC") label.

13. The apparatus of claim 10 in which the reader is further operable to determine the number of units of the product at the premises.

14. The apparatus of claim 10 in which the reader is further operable to determine that a unit of product has been removed from the premises.

15. The apparatus of claim 10 wherein the at least one network device includes a gateway having access to a supplier database having indications of associations between suppliers and VPN tunnels.

16. The apparatus of claim 10 wherein the at least one network device includes the reader, and wherein the reader is operable to mark a packet containing inventory data with a VPN tunnel identifier.

17. The apparatus of claim 10 wherein the VPN tunnel is established via IPSec.

18. The apparatus of claim 10 wherein the VPN tunnel is established via SSL.

\* \* \* \* \*